(12) United States Patent
Zhang et al.

(10) Patent No.: US 7,426,297 B2
(45) Date of Patent: Sep. 16, 2008

(54) SYSTEM AND METHOD FOR REAL-TIME WHITEBOARD CAPTURE AND PROCESSING

(75) Inventors: Zhengyou Zhang, Redmond, WA (US); Liwei He, Redmond, WA (US)

(73) Assignee: Microsoft Corp., Redmond, WA (US)

( * ) Notice: Subject to any disclaimer, the term of this patent is extended or adjusted under 35 U.S.C. 154(b) by 5 days.

(21) Appl. No.: 11/689,171

(22) Filed: Mar. 21, 2007

(65) Prior Publication Data

US 2007/0156816 A1 Jul. 5, 2007

Related U.S. Application Data

(62) Division of application No. 10/804,311, filed on Mar. 19, 2004, now Pat. No. 7,260,278.

(60) Provisional application No. 60/520,887, filed on Nov. 18, 2003.

(51) Int. Cl.
*G06K 9/00* (2006.01)
(52) U.S. Cl. ..................................................... 382/165
(58) Field of Classification Search ......... 382/162–167, 382/224–225, 236, 103, 173; 358/518–540, 358/1.9, 1.15; 345/173, 589–604; 348/211.1–211.14, 348/207.99, 222.1, 14.01–14.16, 273, 254; 709/231; 386/124, 69–70, 111–112; 434/323, 434/350–362
See application file for complete search history.

(56) References Cited

U.S. PATENT DOCUMENTS

| | | | | |
|---|---|---|---|---|
| 5,373,322 A | * | 12/1994 | Laroche et al. | 348/273 |
| 6,188,831 B1 | * | 2/2001 | Ichimura | 386/69 |
| 6,190,178 B1 | * | 2/2001 | Oh | 434/323 |
| 6,671,732 B1 | * | 12/2003 | Weiner | 709/231 |
| 6,806,903 B1 | * | 10/2004 | Okisu et al. | 348/254 |
| 2001/0035976 A1 | * | 11/2001 | Poon | 358/1.15 |
| 2004/0263636 A1 | * | 12/2004 | Cutler et al. | 348/211.12 |
| 2005/0104864 A1 | * | 5/2005 | Zhang et al. | 345/173 |

* cited by examiner

*Primary Examiner*—Ishrat Sherali
(74) *Attorney, Agent, or Firm*—Lyon & Harr, LLP; Katrina A. Lyon

(57) ABSTRACT

A system that captures both whiteboard content and audio signals of a meeting using a video camera and records or transmits them in real-time. The Real-Time Whiteboard Capture captures pen strokes on whiteboards in real time using an off-the-shelf video camera. Unlike many existing tools, the RTWCS does not instrument the pens or the whiteboard. It analyzes the sequence of captured video images in real time, classifies the pixels into whiteboard background, pen strokes and foreground objects (e.g., people in front of the whiteboard), and extracts newly written pen strokes. This allows the RTWCS to transmit whiteboard contents using very low bandwidth to remote meeting participants. Combined with other teleconferencing tools such as voice conference and application sharing, the RTWCS becomes a powerful tool to share ideas during online meetings.

5 Claims, 9 Drawing Sheets

SYSTEM AND METHOD FOR REAL-TIME WHITEBOARD CAPTURE AND PROCESSING

This application claims priority under 35 U.S.C. Section 119(e)(1) of provisional application No. 60/520,887, filed Nov. 18, 2003 and is a divisional application of application Ser. No. 10/804,311 filed Mar. 19, 2004 now U.S. Pat. No. 7,260,278.

BACKGROUND

1. Technical Field

This invention is directed toward a system and method for capturing and transmitting meeting content. More particularly, this invention is directed towards a system and method for capturing and/or transmitting the whiteboard content in real-time.

2. Background Art

Meetings constitute a large part of many workers' working time. Making more efficient use of this time spent in meetings translates into a big increase in productivity.

Although whiteboard sessions are frequent for knowledge workers, they are not perfect. The content on the board is hard to archive or share with others who are not present in the session. People are often busy copying the whiteboard content to their notepads when they should spend time sharing and absorbing ideas. Sometimes they put a "Do Not Erase" sign on the whiteboard and hope to come back and deal with it later. In many cases, they forget or the content is accidentally erased by other people. Furthermore, meeting participants who are on a conference call at remote locations are not able to see the whiteboard content as the local participants do. In order to enable this, the meeting sites often must be linked with expensive video conferencing equipment. Such equipment typically includes a pan-tilt-zoom camera which can be controlled by the remote participants. This configuration is still not always satisfactory because the viewing angle, lighting variation, and image resolution are often inadequate. The lack of functionality of effective archiving and indexing of whiteboard contents is also problematic.

Many technologies exist to capture the whiteboard content automatically. One of the earliest, the whiteboard copier, is a special whiteboard with a built-in copier. With a click of a button, the whiteboard content is scanned and printed. Once the whiteboard content is on paper, it can be photocopied, faxed, put away in the file cabinet, or scanned into digital form. Recent technologies all attempt to capture the whiteboard in digital form from the start. They generally fall into two categories—image capture devices and pen tracking devices.

The devices in the first category capture images of the whiteboard directly. NTSC-resolution video cameras are often used because of their low cost. Since they usually do not have enough resolution for a typical conference room size whiteboard, several video frames must be stitched together to create a single whiteboard image. The ZombieBoard system [10], deployed internally at Xerox's Palo Alto Research Center, uses a Pan-Tilt video camera to scan the whiteboard. The Hawkeye system from SmartTech opts for a three-camera array that takes images simultaneously. Another device in this category is the digital still camera. As high resolution digital cameras get cheaper, taking snapshots of the board with a digital camera has become a popular choice. To clean-up the results, people use software to crop the non-whiteboard region and color-balance the images.

There are several disadvantages of the aforementioned image capture devices, however. For example, they capture the whiteboard content one snapshot at a time so users have to make a conscious decision to take a snapshot of the whiteboard. Additionally, there is usually a lag between writing on the board and taking a snapshot. Using these devices in real time teleconferencing scenarios is not very natural or convenient, if possible at all.

Devices in the second category track the location of the pen at high frequency and infer the content of the whiteboard from the history of the pen coordinates. Mimio by Virtual Ink Corp. is one of the best systems in this category. Mimio is an add-on device attached to the side of a conventional whiteboard and uses special adaptors for dry-ink pens and an eraser. The adapted pen emits ultrasonic pulses when pressed against the board. Two receivers at the add-on device use the difference in time-of-arrival of the audio pulses to triangulate the pen coordinates. Since the history of the pen coordinates is captured, the content on the whiteboard can be reconstructed in real time. And because the content is captured in vector form, it can be transmitted and archived with low bandwidth and storage requirements.

Electronic whiteboards also use pen tracking technology. They go one step further by making the whiteboard an interactive device. For example, the SMARTBoard from Smart-Tech is essentially a computer with a giant touch-sensitive monitor. The user writes on the monitor with a special stylus which is tracked by the computer. The computer renders the strokes on the screen wherever the stylus touches the screen—as if the ink is deposited by the stylus. Because the strokes are computer generated, it can be edited, re-flowed, and animated.

Pen-tracking devices also have several disadvantages, however. Pen-tracking devices require instrumentation either to the pens and erasers or to the surface that they are writing on. For example, Mimio uses special adapters for dry-ink pens, which make them much thicker and harder to press. Electronic whiteboards are not even compatible with the existing whiteboards. They use touch screens as their writing surfaces, which limits their install base due to high cost and small size. If the system is not turned on or the user writes or erases without using the special pens or erasers, the content cannot be recovered by the device. Many people like to use their fingers to correct small mistakes on the whiteboard. This common behavior causes extra strokes to appear on the captured content. Additionally, there is usually minor imprecision in the tracked pen coordinates, which tends to accumulate and cause mis-registrations among the neighboring strokes. Furthermore, pen-tracking devices do not allow multiple users to write on the whiteboard simultaneously. The image capture devices do not have this problem since they work in a What You See Is What You Get (WYSIWYG) manner.

In addition to whiteboard capture devices, much research has been done on the capture, integration, and access of the multimedia experience. People have developed techniques and systems that use handwritten notes, whiteboard content, slides, or manual annotations to index the recorded video and audio for easy access [1,2,4,6,7,8,9,10,11,12,13,14]. Inspired by those systems, a Whiteboard Capture System (WCS) was developed [0]. The goal of that project was to build a whiteboard capture system that combines the benefits of both image capture devices and pen tracking devices. The key design decision that was made was to use an image capture device as input. Without the requirement for special pens and erasers the interaction with the whiteboard is much more natural. Furthermore, since this WCS takes images of the whiteboard directly, there is no misregistration of the pen strokes. As long as the users turn on the system before erasing, the content will be preserved. Additionally, images captured with a camera provide much more contextual information such as who was writing and which topic was discussed (usually by hand pointing).

Although the WCS can readily and accurately capture key images and associated audio, its processing is too complex and time consuming to operate in real-time. Additionally, since a particular digital camera was chosen as the input device for one embodiment of the WCS for its high resolution (4 MP) and the availability of a software development kit, which allows one to control the camera from the PC, complex camera control is not necessary. However, because the camera is connected to the host PC via low bandwidth USB 1.1, the frame rate is limited to 5 second per frame. At such a low frame rate, no attempt could be made to use the WCS as a real time conferencing tool. Therefore, the previous WCS was designed to analyze and browse offline meeting recordings. From the input image sequence, a set of key frames that captures the history of the content on whiteboard and the time stamps associated with each pen strokes was computed. A key frame contains all the visual content before a major erasure. This information can then be used as a visual index to the audio meeting recording. Aside from the inability to operate in real-time, the previous WCS also had to be calibrated every time it was used or installed.

Therefore, what is needed is a system and method for capturing whiteboard content in real time that allows the recording and browsing of the content after the meeting, as well as transmission to remote meeting participants in real time. The system should not require expensive specialized video conferencing equipment and should be easy to set up and use. Additionally, transmission to remote meeting participants should use as little network bandwidth as possible to transfer the whiteboard content making the system suitable for even dial up network connections.

SUMMARY

The present invention is directed toward a system and process that relieves meeting participants from the mundane tasks of note taking by capturing whiteboard content automatically and communicating the whiteboard content to remote meeting participants in real time using a fraction of the bandwidth required if video conferencing equipment were used. The Real-Time Whiteboard Capture System (RTWCS) of the present invention employs an ordinary whiteboard, not an electronic whiteboard, like some other whiteboard capture systems. Thus, the system can be used with any existing whiteboard without modification. The RTWCS also does not need to be calibrated when it is set up as it automatically locates the whiteboard if it is within its field of view.

The RTWCS employs various techniques that allow it to operate in real time. First, rather than analyzing the images at pixel level, the RTWCS divides each video frame into rectangular cells to lower the computational cost. Second, the RTWCS's analyzer is structured as a pipeline of six analysis modules. If a cell image does not meet the condition in a particular module, it will not be further processed by the subsequent modules in the pipeline. Therefore, many cell images do not go through all six modules in the pipeline. At the end, only a small number of cell images containing newly appeared pen strokes come out of the analyzer. The third strategy to allow the RTWCS to process data in real time is specific to the video camera that is used in the RTWCS. This camera (an Aplux MU2 in one embodiment) allows the video frames to be directly accessed in Bayer format, which is the single channel raw image captured by the CMOS sensor. In general, a demosaicing algorithm is run on the raw image to produce a RGB color image. By processing the cell images in raw Bayer space instead of red, green, blue (RGB) color space and delaying demosaicing until the final step and running it only on the cells containing new strokes, the RTWCS saves memory and processing by at least 66%. An additional benefit is that one can obtain a higher quality RGB image at the end by using a more sophisticated demosaicing algorithm than the one built into the camera driver.

The RTWCS keeps track of some states as it processes the input video frames. These include: 1) The last video frame it has processed; 2) The age of each cell image in the last frame. The age is defined to be the number of frames that the cell image remains unchanged; 3) Cell images with whiteboard content that have been detected so far; 4) The whiteboard background model.

In one embodiment of the invention, an image frame cell in Bayer format is input into the RTWCS. Once input, this image frame cell is compared to the previous image in the corresponding cell location in the previous frame and it is determined if the cell image has changed, preferably using a Normalized Cross-correlation algorithm. If the cell image has changed, the cell age is set to 1 and if it is determined that the cell image has not changed, the cell age is incremented. An assessment is then made as to whether its age is greater than a given age threshold. If not, the cell frame image is not processed any further. If the cell age is greater than the age threshold, then the whiteboard background is computed for this cell frame image and then this cell frame image is used to update the whiteboard color model. The cell image is then classified as either a foreground or whiteboard cell. Any cells classified as foreground are no longer processed. If the cell frame image is a whiteboard cell, any newly appeared strokes are extracted. Optionally, the color of the newly extracted strokes can be enhanced and the newly extracted strokes can be transmitted to a remote meeting participant. This process is repeated for each image frame cell in the frame for each sequential frame. It should be noted that most processing is performed on image data in Bayer format.

Because of white-balancing and color enhancement, the quality of the whiteboard contents that the remote participant sees is much better than that of that would be captured during a meeting using video conferencing equipment.

Besides providing new conferencing functionality in real-time, the RTWCS still provides for the functionality of the aforementioned WCS. For example, from the input image sequence, a set of key frames that captures the history of the content on whiteboard and the time stamps associated with each pen stroke is computed. This information can then be used as a visual index to the audio meeting recording.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

1.0 Exemplary Operating Environment

Figure 1:
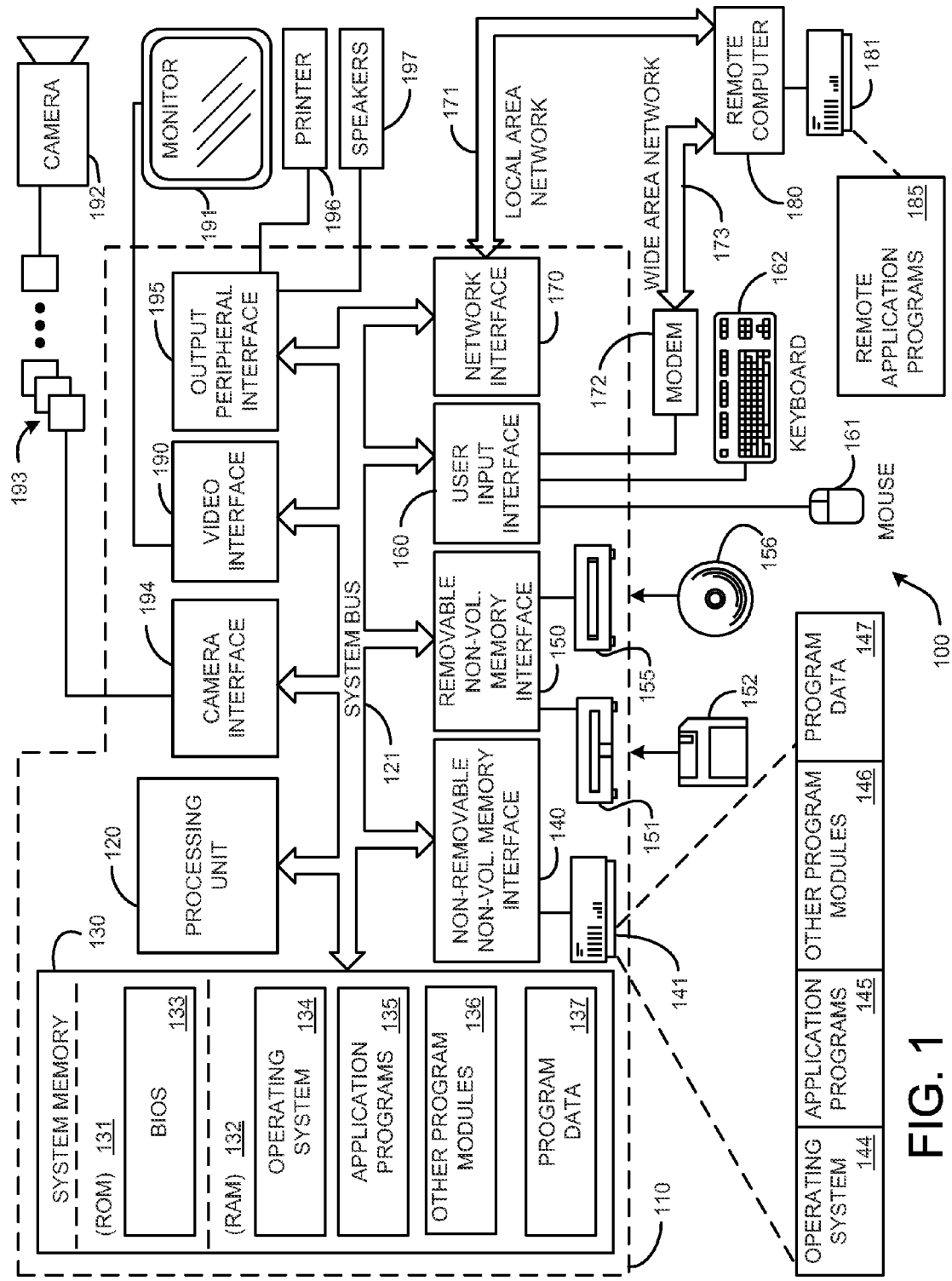
FIG. 1 is a diagram depicting a general purpose computing device constituting an exemplary system for implementing the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as an input device to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

2.0 Real-Time Whiteboard Capture and Processing System and Method.

2.1 System Architecture.

Figure 2:
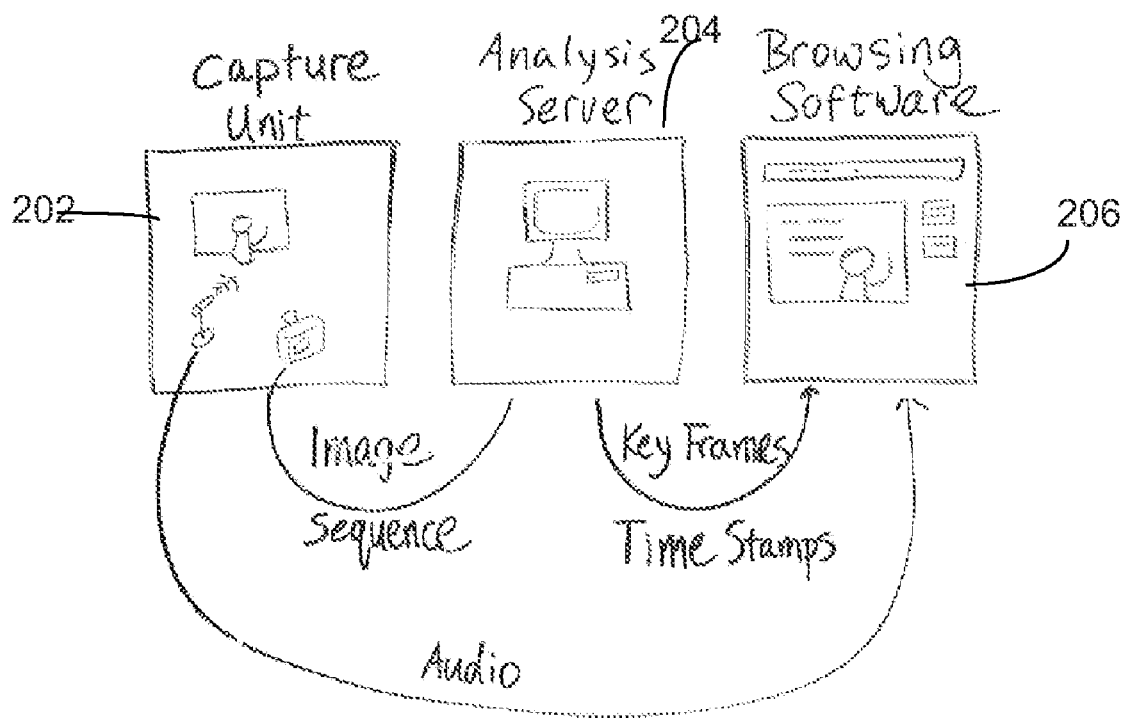
FIG. 2 is a diagram depicting three main components of the white board capture system—the capture unit, analysis server and the browsing software.

Conceptually, the Real-time Whiteboard Capture System (RTWCS) consists of three primary components: a capture device and interface 202, an analysis/processing server 204, and browsing software 206, as shown in FIG. 2.

1. Capture Device and Capture Interface: The capture device of the RTWCS is used to capture images of the whiteboard content and to record the audio associated with the creation of the whiteboard content. The capture unit is installed in a room where meetings take place. It includes a digital video camera, a microphone, and a personal computer (PC). The capture device takes video of the whiteboard and records audio via the microphone that is stored to a PC. Both video and corresponding audio are time stamped. The video and the audio samples are obtained at a common clock, usually the system clock. The timing of the common clock is associated with the video and audio samples and is stored as their time stamps.

2. Analysis server: The analysis server 204 is located in a central place and analyzes and stores the video and associated audio of the whiteboard in real-time. It is thus available for later viewing. Like the WCS, the analysis server of the RTWCS analysis server can calculate key frames and index the recorded whiteboard images as described in co-pending U.S. patent application Ser. No. 10/178,443, entitled "A SYSTEM AND METHOD FOR WHITEBOARD AND AUDIO CAPTURE" filed on Jun. 19, 2002. However, the RTWCS' analysis server 204 is also responsible for continually compressing, transmitting and synchronizing the whiteboard content and associated audio to remote meeting participants. In some embodiments of the invention, the analysis server 204 is also responsible for capturing handwritten annotations on a printed document in real-time.

3. Browsing software: The browsing software 206 allows the user to view and play back the recorded and analyzed meeting data. The browsing software 206 is preferably provided as a web plug-in to be installed by the users who wish to view the meeting recordings.

2.2 Image Acquisition

Figure 3:
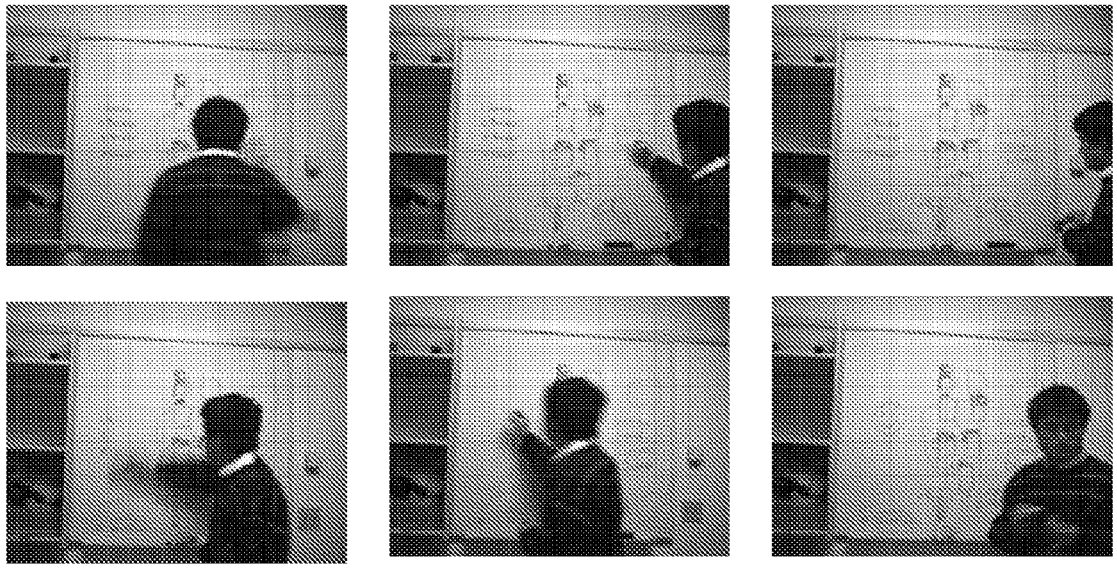
FIG. 3 shows selected frames from an 82 second input image sequence.

The input to RTWCS is a sequence of video images, preferably in Bayer format. Selected frames from an 82.5 second video input are shown in FIG. 3. It is necessary to analyze the video image sequence in order to separate the whiteboard background from the person in the foreground and to extract the new pen strokes as they appear on the whiteboard.

As mentioned earlier, there are a number of advantages in using a high-resolution video camera over the sensing mechanism of devices like Mimio or an electronic whiteboard. However, the RTWCS has its own set of unique technical challenges. For instance, the whiteboard background color cannot be pre-calibrated (e.g., by taking a picture of the blank whiteboard) because each indoor room has several light settings that may vary from session to session and outdoor room lighting condition is influenced by the weather and the direction of the sun. In addition, people frequently move between the camera and the whiteboard, and these foreground objects may occlude some portion of the whiteboard and cast shadows on it. Within a sequence, there may be no single frame that is completely unoccluded. These problems need to be resolved in order to extract the new pen strokes.

2.2.1 Capture Device

Since the development of the initial Whiteboard Capture System (WCS), there have been tremendous advances in digital imaging hardware. One notable example is the availability of inexpensive high resolution video cameras and high-speed connections. For example, with an Aplux MU2 video camera connected to any PC with a USB 2.0 port, one can capture 1.3 mega pixel images at 7.5 Hz. The resolution of each video frame is 1280 pixels by 1028 pixels—equivalent to 18 dpi for a 6' by 4' board. At 7.5 Hz, the whiteboard content can be captured in near real time—good enough to use in teleconferences. The RTWCS employs such a high resolution video camera (e.g. in one embodiment an Aplux MU2). This provides a perfect compromise between the NTSC video camera and the high-resolution still image camera.

2.2.2 Capture Interface Requirements.

Like the initial WCS, the RTWCS does not require people to move out of the camera's field of view during capture as long as they do not block the same portion of the whiteboard during the whole meeting. Unlike WCS, the RTWCS does not need special installation or calibration. Sitting on a built-in stand, the video camera can be placed anywhere that has a steady and clear view of the whiteboard. It can be moved occasionally during the meeting. After each move, it will automatically and quickly find the whiteboard region again. In general, the RTWCS does this by considering everything in the field of view of the camera as possible whiteboard, computing the color for each cell corresponding to a rectangular portion of the field of view and then fitting a plane across the cells to identify any flat regions where the color changes smoothly. Once the planes are fit, outliers (colors that are different from the plane that is fitted) are discarded. Details of the process are provided in Section 2.3.3. This improvement has made the Real-time Whiteboard Capture System much more portable and easier to use than the WCS. Although the camera can be placed anywhere, the intended capture area should occupy as much video frame as possible in order to maximize the available image resolution. For better image quality, it is also better to place the camera right in front of the whiteboard in order to utilize the depth-of-field of the lens to avoid out of focus.

2.2.3 Automatic Camera Exposure Adjustment.

The camera exposure parameter is preferably kept constant. If the light setting does not change, the color of whiteboard background should stay constant in a sequence. In one embodiment of the invention, the RTWCS contains a module that automatically sets the exposure to minimize the number of saturated pixels (i.e. brightness level is 0 or 255). This module is run once when the system is started and triggered to run again whenever a global change in cell color is detected (see Section 2.3.2).

2.3 Image Sequence Analysis

Since the person who is writing on the board is in the line of sight between the camera and the whiteboard, he/she often occludes some part of the whiteboard. It is thus necessary to segment the images into foreground objects and whiteboard. For that, two primary heuristics are relied on: 1) Since the camera and the whiteboard are stationary, the whiteboard background cells are stationary throughout the sequence until the camera is moved; 2) Although sometimes foreground objects (e.g., a person standing in front of the whiteboard) occlude the whiteboard, the pixels that belong to the whiteboard background are typically the majority. The RTWCS exploits these heuristics extensively.

The RTWCS applies several strategies to make it efficient enough to run in real time.

First, rather than analyzing the images at pixel level, the RTWCS divides each video frame into rectangular cells to lower the computational cost. The cell size is preferably roughly the same as what one expects the size of a single character on the board (16 by 16 pixels in one embodiment of the RTWCS). The cell grid divides each frame in the input sequence into individual cell images, which are the basic unit in the RTWCS's analysis.

Figure 4A:
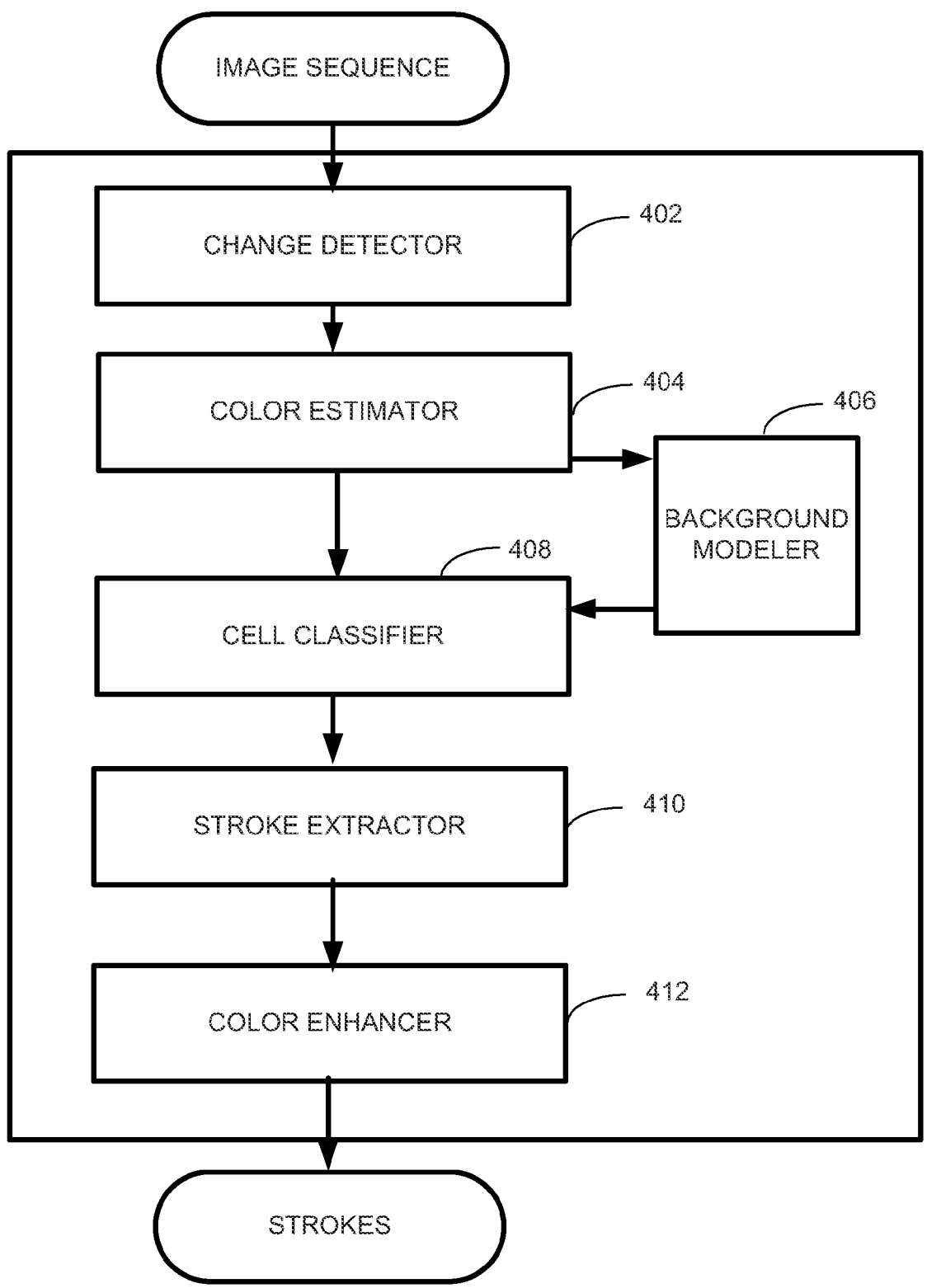
FIG. 4A is a system diagram depicting the image analysis module of one embodiment of the system and method according to the invention.

Second, the RTWCS's analyzer is structured as a pipeline of six analysis modules (see FIG. 4A). If a cell image does not meet the condition in a particular module, it will not be further processed by the subsequent modules in the pipeline. Therefore, many cell images do not go through all six modules. At the end, only a small number of cell images containing the newly appeared pen strokes come out of the analyzer. The six modules are:

1. Change detector 402: This module determines if the cell images have changed since last frame.
2. Color estimator 404: This module computes the background color of the cell images—the color of blank whiteboard.
3. Background modeler 406: This is a dynamic module that updates the whiteboard background model by integrating the results computed from the previous modules which may have missing parts due to occlusion by foreground objects.
4. Cell classifier 408: This module classifies the cell images into foreground or whiteboard cells.
5. Stroke extractor 410: This module extracts the newly appeared strokes.
6. Color enhancer 412: The color enhancer enhances the color of the newly appeared extracted strokes.

The change detector, color estimator, background modeler and cell classifier modules all preferably operate one image data in Bayer color space.

Figure 5:
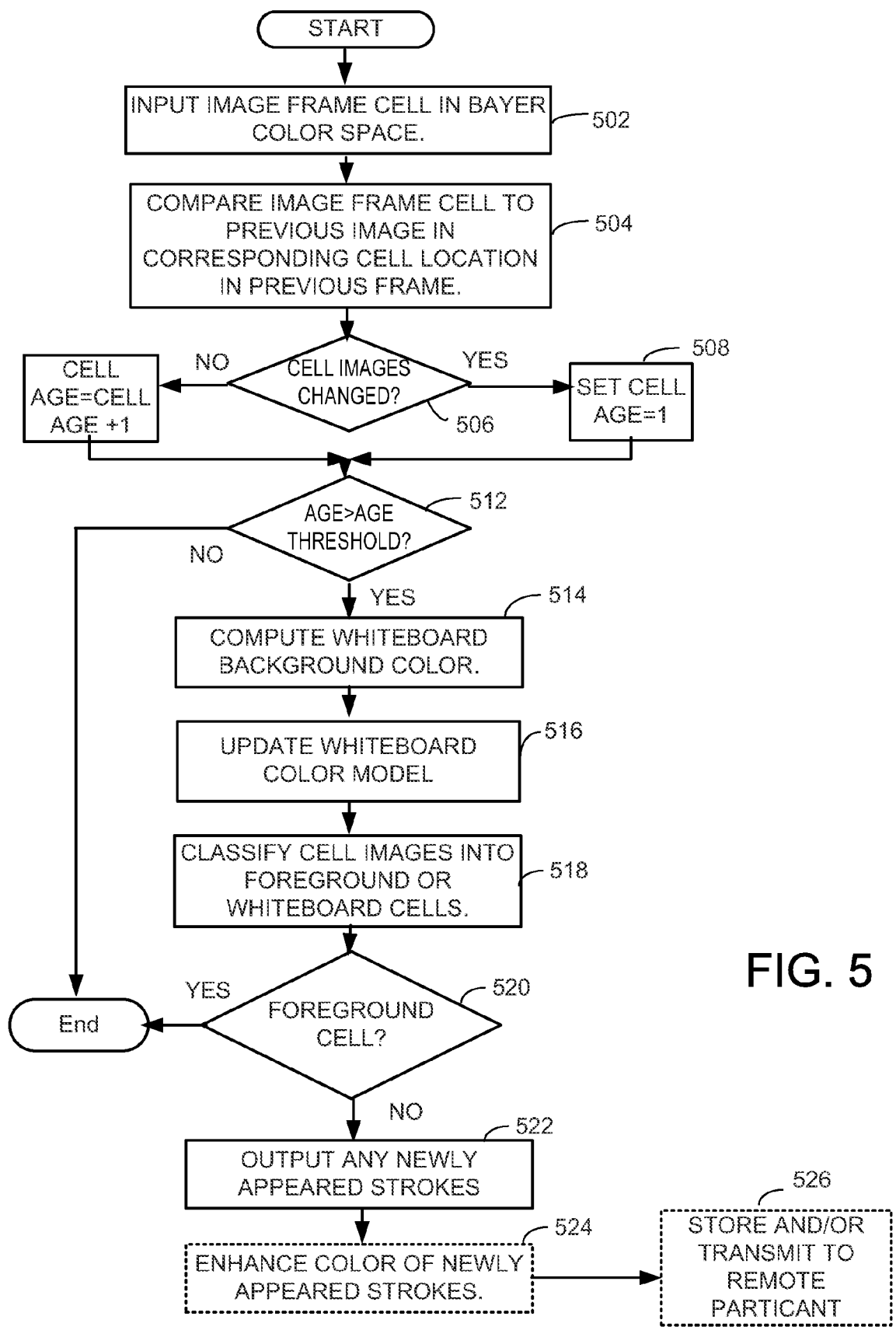
FIG. 5 is a flow chart depicting the image analysis processing of the system and method according to the invention.

A flowchart depicting the processing of one embodiment of the invention is shown in FIG. 5. An image frame cell in Bayer format is input into the RTWCS, as shown in process action 502. This image frame cell is compared to the previous image in the corresponding cell location in the previous frame (process action 504). It is determined if the cell images have changed (process action 506), preferably using a Normalized Cross-correlation algorithm, and if so, the cell age is set to 1 (process action 508). If it is determined that the cell image has not changed (process action 506), the cell age is incremented (process action 510). An assessment is then made as to whether its age is greater than a given age threshold (process action 512). If not, the cell frame image is not processed any further. If the cell age is greater than the age threshold, then the whiteboard background is computed for this cell frame image and then this cell frame image is used to update the whiteboard color model (process actions 516).

The cell image is then classified as either a foreground or whiteboard cell, as shown in process action 518. Any cells classified as foreground are no longer processed (process action 520). If the cell frame image is a whiteboard cell, any newly appeared strokes are output (process action 522). Optionally, the color of the newly extracted strokes can be enhanced (process action 524) and stored and/or transmitted to one or more remote meeting participants (process action 526). This process is repeated for each image frame cell in the frame for each sequential frame.

The third strategy employed to let the RTWCS operate in real-time is specific to the video camera that is used in the RTWCS. The video camera used (e.g., an Aplux MU2) allows the video frames to be directly accessed in Bayer format, which is the single channel raw image captured by the CMOS sensor. In general, a demosaicing algorithm is run on the raw image to produce an RGB color image. By processing the cell images in raw Bayer space instead of RGB space and delaying demosaicing until the final step and running it only on the cells containing new strokes, the RTWCS saves memory and processing by at least 66%. An additional benefit is that one can obtain a higher quality RGB image at the end by using a more sophisticated demosaicing algorithm than the one built into the camera driver.

An overview of the RTWCS having been provided, the following paragraphs provide the details of the system and method according to the present invention.

2.3.1 Analysis State

The RTWCS keeps track of some states as it processes the input video frames. These include: 1) The last video frame it has processed; 2) The age of each cell image in the last frame. The age is defined to be the number of frames that the cell image remains unchanged; 3) Cell images with whiteboard content that have been detected so far; 4) The whiteboard background model (see Section 2.3.4 for details).

2.3.2 Assigning Age to Cells and Determining Cell Image Change.

The RTWCS first assigns an age to each cell image. To determine whether a cell image has changed, it is compared against the image of the same cell (e.g., the cell in the same location) in the previous frame using a modified Normalized Cross-Correlation (NCC) algorithm. Note that the NCC is applied to the images in the Bayer space.

Consider two cell images I and I'. Let $\bar{I}$ and $\bar{I}'$ be their mean colors and $\sigma$ and $\sigma'$ be their standard deviations. The normalized cross-correlation score is given by $$c = \frac{1}{N\sigma\sigma'} \sum_i (I_i - \bar{I})(I'_i - \bar{I}')$$

where the summation is over every pixel i and N is the total number of pixels. The score ranges from −1, for two images not similar at all, to 1, for two identical images. Since this score is computed after the subtraction of the mean color, it may still give a high value even two images have very different mean colors. So one has an additional test on the mean color difference based on the Mahalanobis distance [3], which is given by $d=|\bar{I}-\bar{I}'|/\sqrt{\sigma^2+\sigma'^2}$. In summary, two cell images I and I' are considered to be identical and thus should be put into the same group if and only if $d<T_d$ and $c>T_c$. In one embodiment of the invention, $T_d=2$ and $T_c=0.707$.

If the comparison indicates a cell image is changed from the previous frame, its age is set to 1. Otherwise, it is incremented by 1. At each frame, all the cells that have been stationary for more than the age threshold (4 frames in one embodiment of the RTWCS—about 0.5 second at 7.5 Hz) are considered to be the background candidates and fed to the Whiteboard Color Model Update module. If the age is not greater than the age threshold, the cell image is not processed further during this frame. The age threshold is a trade-off between the output delay and analysis accuracy.

Figure 6:
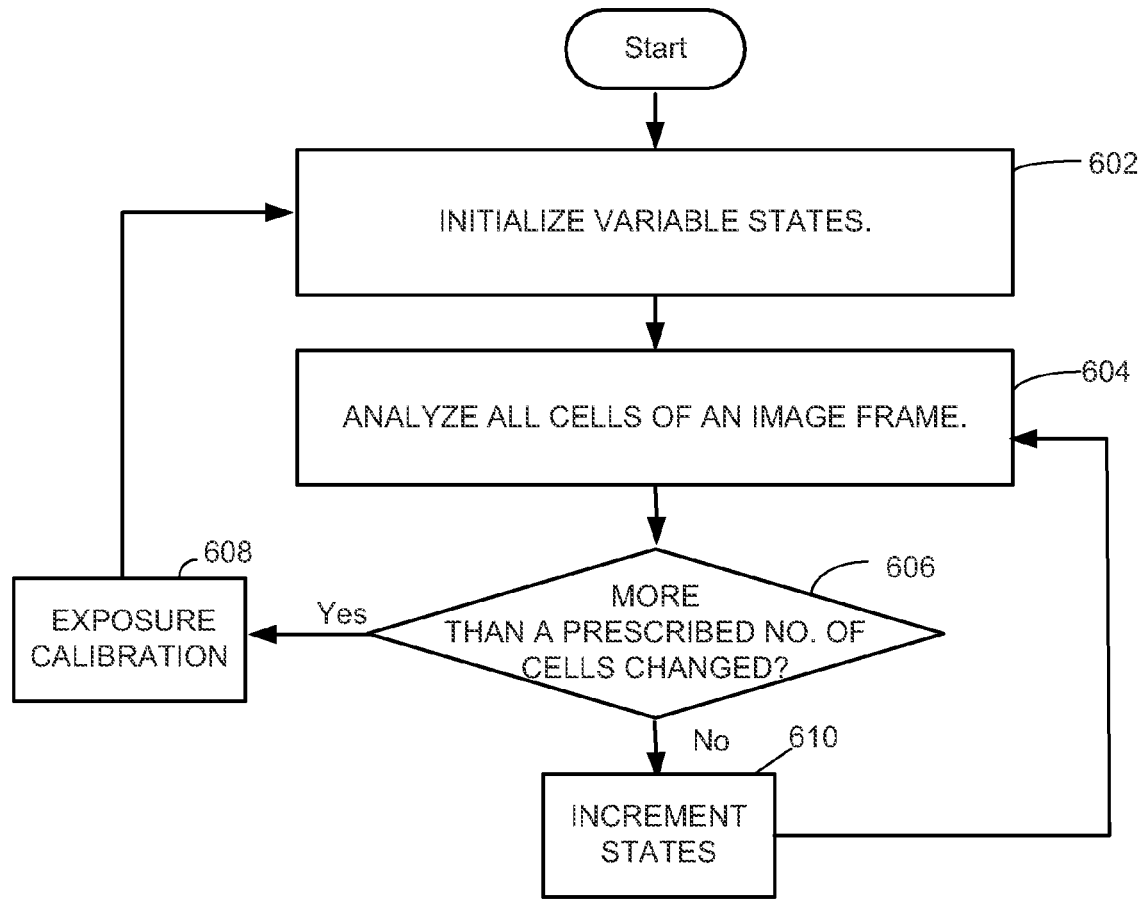
FIG. 6 is a flow chart depicting the overall process of analyzing the input frames.

The RTWCS also computes the percentage of the cell images that have changed. If the change is more than 90%, the RTWCS assumes that something drastic and global has happened since the last frame (e.g. light setting is changed, camera is moved, etc.). In such an event, all states are re-initialized and an exposure calibration routine is called. Other more localized changes (e.g. people moving across, gradual change in sun light) are handled dynamically by the Whiteboard Color Model Update Module. More specifically, as shown in FIG. 6, the system initializes the states of the variables of the system (e.g., cell age, last video frame, cell images with whiteboard content detected so far, whiteboard background model), and the cells of a given frame are analyzed to see if they have changed (process action 604). If more than a prescribed number of cells have changed (e.g., more than 90% in one embodiment), there is a high probability that the lighting condition has changed (e.g., a light is turned on or off); in consequence, an exposure calibration routine is called (process action 606) (see below) and the states are reinitialized (process action 602).

The exposure calibration procedure (process action 606) works as follows. If a camera allows the exposure parameter to be controlled by software, the exposure calibration procedure automatically sets the appropriate amount of light to be captured to form each video frame in order to avoid over or under exposing the resulting images. This embodiment uses a binary search algorithm for an exposure setting. The RTWCS initializes the lower and upper limits of the search range to be the entire range of the exposure setting (e.g. 0 and 255 respectively for 8 bits cameras). To start with, the exposure is set to be the average of the lower and upper limits. For each incoming image, measurements of over-exposure and under-exposure are taken. For example, a histogram of pixel intensity can be constructed. If over 1% of pixels take the value 255, then it is over-exposed. If over 1% of pixels take the value 0, then it is under-expose. If it is neither over-exposed nor under-exposed, then the procedure is completed. If it is both over- and under-exposed, then the procedure is aborted since the dynamic range of the scene exceeds that of the camera sensor. If it is over exposed, then the upper searching limit is set to be the current exposure setting. If it is under exposed, then the lower searching limit is set to be the current exposure setting. In either of the latter cases, the current exposure is set to be the average of the updated lower and upper limits. The procedure is repeated until it completes.

If a camera has more than one parameter controllable by the software (e.g., both exposure and contrast), one can design a more flexible calibration procedure such that both over- and under-exposures are avoided.

2.3.3 Computing the Background Color.

To classify cells, the RTWCS needs to know for each cell what the whiteboard background color is (i.e. the color of the whiteboard itself without anything written on it). The whiteboard background color is also used in color-enhancing the extracted cell images, so it needs to be estimated accurately to ensure the quality.

Since the ink absorbs the incident light, the luminance of the whiteboard pixels is higher than pen stroke pixels. The whiteboard color within the cell is therefore the color with the highest luminance. In practice, the colors of the pixels in the top 10th percentile are averaged in order to reduce the error introduced by sensor noise. Hence, the color of each cell is computed by first sorting the pixels of the same color channel (128 green, 64 blue and 64 red values in a 16×16 cell image in Bayer space) and then taking the values of top 10% percentile in each channel.

Figure 7:
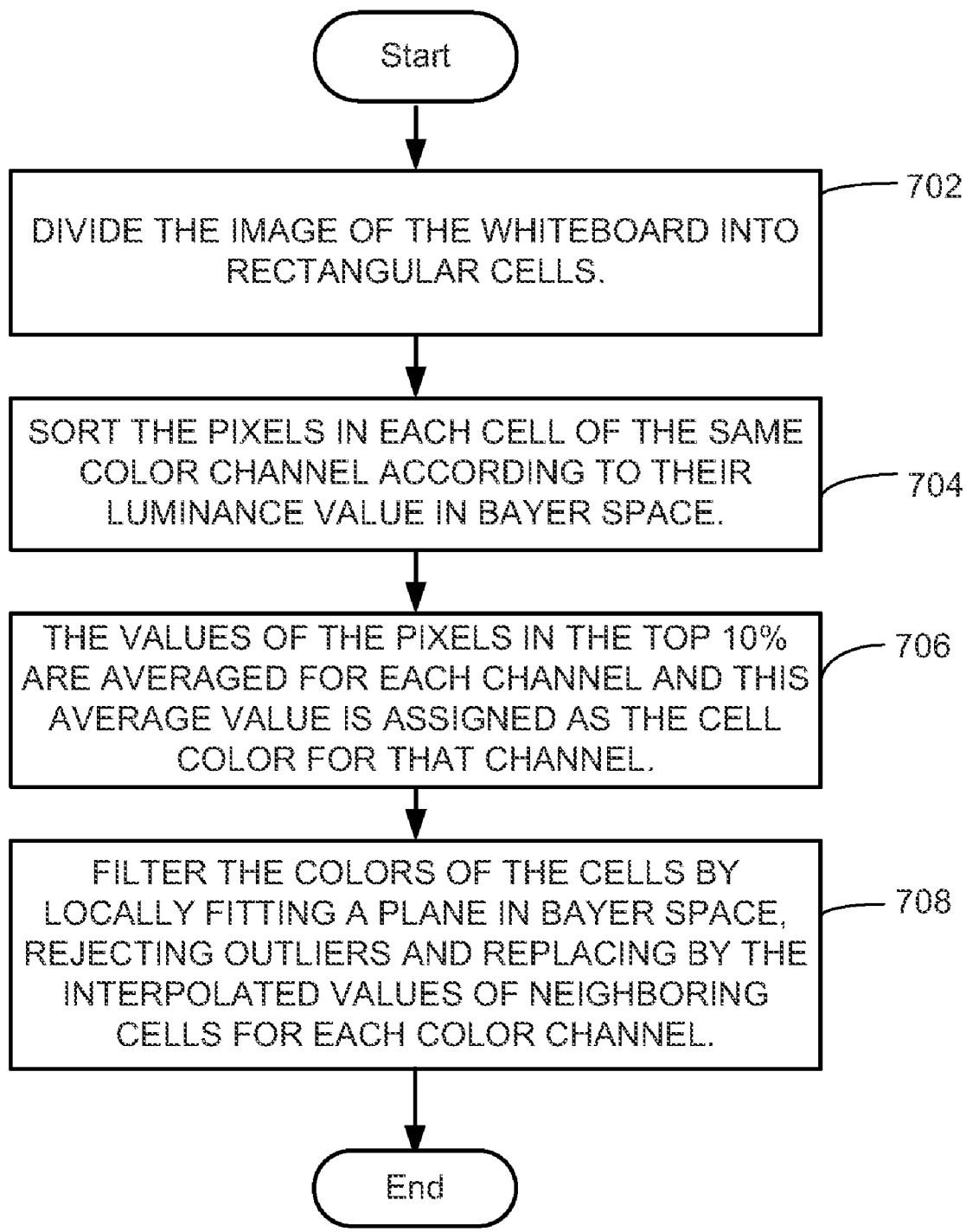
FIG. 7 is a technique of computing whiteboard color.

More specifically, as shown in FIG. 7, the image of the whiteboard is divided into rectangular cells (process action 702), and the pixels in each cell of the same color channel (preferably in Bayer color space) are sorted according to their luminance values (process action 704). The values of the pixels in the top 10% is averaged and assigned as the cell color for that channel (process action 706). The cells can be filtered by locally fitting a plane in Bayer space, rejecting outliers and replacing these outliers by the interpolated values of neighboring cells for each color channel (process action 708).

2.3.4 Updating the Whiteboard Color Model.

Figures 8A, 8B, 8C:
FIG. 8A shows a image of the processing by the system and method according to the invention: Depicts color of the cell images. Note that the strokes on the whiteboard are removed by the background color estimation module.
FIG. 8B shows a image of the processing by the system and method according to the invention: Colors of the cell images that go into the Update Module. Note that black regions contain the cell colors that are filtered out by both the change detector and the color estimator.
FIG. 8C shows a image of the processing by the system and method according to the invention: Integrated whiteboard color model.

The color computed from the previous section will give good estimation of whiteboard color for the cells containing some whiteboard background. Though, it will give the wrong color when the cells contain only the foreground or pen strokes (first image in FIG. 8). The RTWCS has to identify those cells to prevent them from contaminating the whiteboard color model.

The RTWCS uses a least-media-squares algorithm, which fits a global plane over the colors and throws away the cells that contain outlier colors (see Appendix for details). The remaining cells are considered as background cells and their colors are used to update the whiteboard background (second image in FIG. 8).

The RTWCS then uses a Kalman filter to dynamically incorporate the background colors computed from the current frame into the existing whiteboard background color model. The state for the cell i is its color $C_i$, together with variance $P_i$ representing the uncertainty. $P_i$ is initially set to $\infty$ to indicate no observation is available. The update is done in two steps:

1) Integrate. Let $Q_i$ be the color of cell i computed from the current frame. There is also an uncertainty, $Q_i$, associated with $O_i$. In one embodiment of the RTWCS, it can only be one of two values: $\infty$ if the cell color is an outlier, 4 otherwise (i.e., the standard deviation is equal to 2 intensity levels). Considering possible lighting variation during the time elapsed since the last frame, the uncertainty $P_i$ is first increased by $\Delta$ (4 in one embodiment of the system, equivalent to a standard deviation of 2). $C_i$ and $P_i$ are then updated according to the classic Kalman filter formula:

$$K = \frac{P_i}{P_i + Q_i}$$
$$C_i = C_i + K \cdot (O_i - C_i)$$
$$P_i = (1 - K) \cdot P_i$$

2) Propagate. In order to fill the holes created by the cells that are occluded by foreground objects and to ensure the color model is smooth, the cell colors are propagated to the neighboring cells. For each cell i, it incorporates the 4 of its neighbors' states according to the following:

$$C_i = \frac{C_i P_i^{-1} + \frac{1}{16}\sum_j C_j(P_j + \Delta)^{-1}}{P_i^{-1} + \frac{1}{16}\sum_j (P_j + \Delta)^{-1}}$$

$$P_i = \left(P_i^{-1} + \frac{1}{16}\sum_j (P_j + \Delta)^{-1}\right)^{-1}$$

Note that one increases the uncertainty of its neighbors by $\Delta$ (4 in our system) to allow color variation. A hole of size N generally takes N/2 frames to get filled. Since the uncertainty in the cells with filled values is much larger than the ones with the observed values (due to added $\Delta$), the filled values are quickly supplanted by the observed values once they become available. An example of an integrated whiteboard color is the third image in FIG. 8C. Note that the bookshelf area in the left side of the image is never filled.

2.3.5 Classifying Cells.

This module determines whether a cell image is a foreground object or the whiteboard. In the cell classifying process, the cell image being operated on converts the cell image from Bayer color space to RGB color space on a cell basis, vice pixel basis. The RTWCS performs this in two levels: individual and neighborhood.

Figure 9:
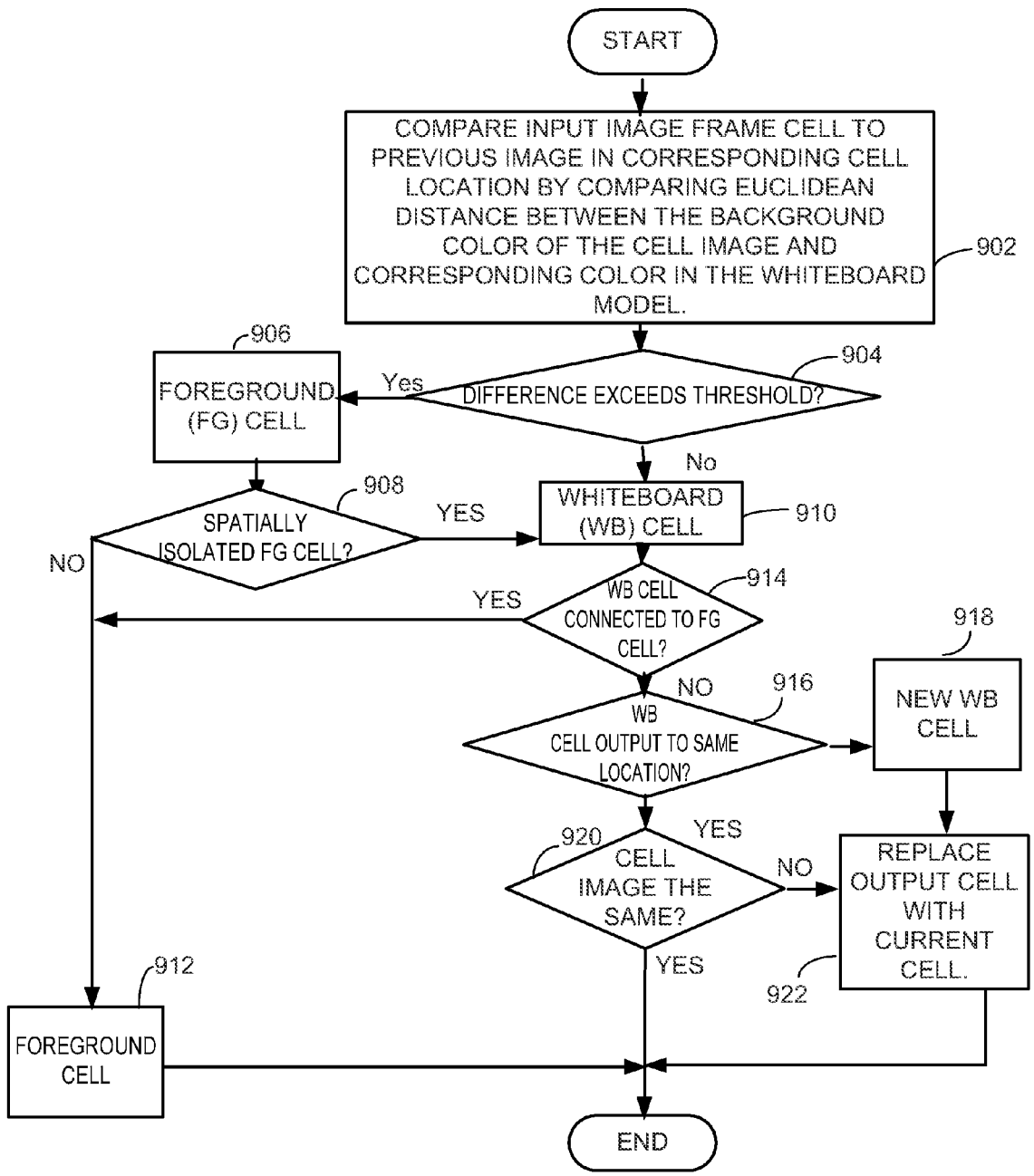
FIG. 9 is a flow chart depicting the cell classification process of the system and method according to the present invention.

As shown in FIG. 9, at the individual cell level, given a good whiteboard color model, the RTWCS simply computes the Euclidean distance between the background color of the cell image (computed in Section 2.3.2) and the color of the corresponding cell location in the whiteboard background model (process action 902). If the difference exceeds a threshold (there are four brightness levels in one embodiment the system), the cell image is classified as a foreground object (process actions 904, 906).

Figure 10:
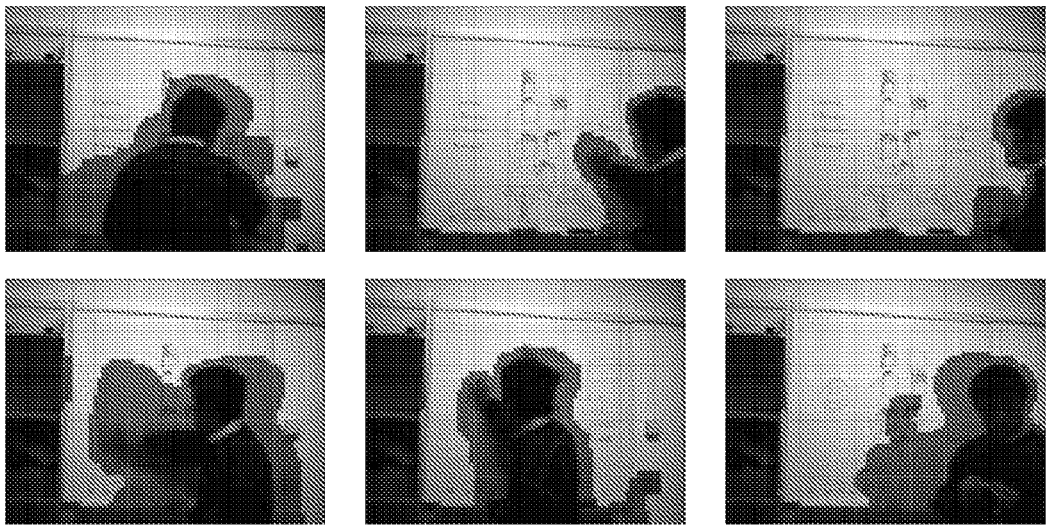
FIG. 10 shows selected frames of classification results.

However, more accurate results can be achieved by utilizing spatial relationship among the cell groups. The basic observation is that foreground cells should not appear isolated spatially since a person usually blocks a continuous region of the whiteboard. So at the neighborhood level, the RTWCS performs two filtering operations on every frame. First, the RTWCS identifies isolated foreground cells and reclassifies them as whiteboard cells (process actions 908, 910). This operation corrects the misclassification of the cells that are entirely filled with strokes. Second, the RTWCS reclassifies whiteboard cells which are immediately connected to some foreground cells as foreground cells (process action 912). One main purpose of the second operation is to handle the cells at the boundaries of the foreground object. Notice that if such a cell contains strokes, the second operation would incorrectly classify this cell as a foreground object. It will be correctly re-classified as whiteboard once the foreground object moves away. Extending the foreground object boundary delays the recognition of strokes by a few frames, but it prevents some parts of the foreground object from being classified as strokes—a far worse situation. FIG. 10 provides samples of classification results.

2.3.8 Extracting New Strokes

The cells classified as foreground are not further processed. For cells classified as whiteboard, the RTWCS checks whether there is a whiteboard cell already existing in the same cell location in the output depository (process action 916). If not, the cell is a new whiteboard cell, as shown in process action 918. If a whiteboard cell does exist, the RTWCS still needs to check whether the existing cell and the current cell image are the same, using the same image difference algorithm in Section 2.3.2 (process action 920). If they are different, the user probably has erased the whiteboard and/or written something new, and therefore the whiteboard cell in the output depository is replaced by the current cell image (process action 922). Periodically (every 30 seconds in one embodiment), the RTWCS updates all existing whiteboard cells with current cell images to account for possible lighting variations.

2.3.9 Color-enhancing the Stroke Images.

At this stage, the newly extracted cell images are finally converted from raw Bayer images into RGB images. Any conventional demosaicing algorithm can be used. For example, the RTWCS can use a demosaicing algorithm proposed by Laroche-Prescott [5]. Alternately, for example, the RTWCS could employ a demosaicing algorithm which is the subject of a co-pending patent application entitled "HIGH-QUALITY GRADIENT-CORRECTED LINEAR INTERPOLATION FOR DEMOSAICING OF COLOR IMAGES" filed on Mar. 15, 2004.

After demosaicing, the images still look color-shifted and noisy. They need to be white-balanced and color-enhanced, which also helps when the images are printed and compressed. The process consists of two steps:

1. Make the background uniformly white and increase color saturation of the pen strokes. For each cell, the whiteboard color computed in Section 2.3.2, $\bar{I}_w$, is used to scale the color of each pixel in the cell:

$$I_{out} = \min\left(255, \frac{I_{in}}{\bar{I}_w} \cdot 255\right).$$

2. Reduce image noise. The RTWCS remaps the value of each color channel of each pixel in the output frames according to an S-shaped curve.

Figure 4B:
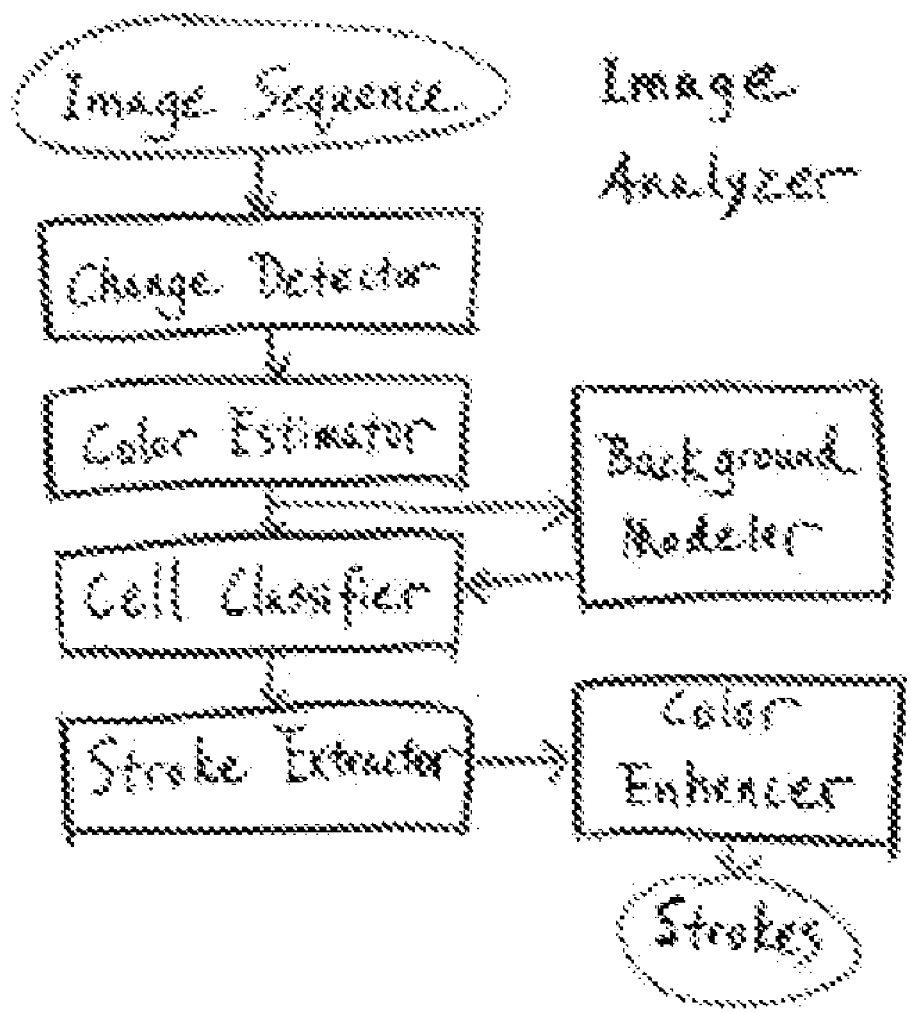
FIG. 4B is the same diagram shown in FIG. 4A captured and color enhanced by the system and method according to the invention.

FIG. 4B is an example of such color enhancement.

3.0 Teleconferencing Experience.

To test the RTWCS in a real teleconference setting, in one embodiment of the RTWCS the system was adapted to be a plug-in to a Whiteboard applet of the Microsoft Windows Messenger. The Whiteboard applet allows the users at two ends of a Windows Messenger session to share a digital whiteboard. The user at one end can paste images or draw geometric shapes and the user at the other end can see the same change almost instantaneously. Usually, the user draws objects with his mouse, which is very cumbersome. With the RTWCS, the user can write on a real whiteboard instead.

The RTWCS in the tested embodiment takes 45-50% processing power of a 2.4 GHz Pentium 4 PC. Once launched, the RTWCS initializes in about 5 seconds, which includes the time to do exposure calibration, initialize the whiteboard color model, and capture the content already existing on the whiteboard.

The changes to the whiteboard content are automatically detected by the RTWCS and incrementally piped to the Whiteboard applet as small cell image blocks. The Whiteboard applet is responsible for compressing and synchronizing the digital whiteboard content shared with the remote meeting participant. The remote participant can add annotations on top of the whiteboard image using the mouse. When used with other Windows Messenger tools, such as voice conferencing and application sharing, whiteboard sharing becomes a very useful tool in communicating ideas.

The time delay between the appearance of the stroke in input video and showing up on the local Whiteboard applet is 1 second. Network transport takes additional 0.5 second or more depending on the distance between the two ends. Because the resulting image contains only uniform background and a handful of colors, the required communication bandwidth after compression is proportion to the amount of content that the user produces. Using GIF compression, a reasonably full whiteboard image at 1.3 MP takes about 200K bytes (FIG. 4B takes 70K bytes). After the initial image capture, the whiteboard updates take 50-100 bytes per cell. Since usually only a handful of cells are changing at a time when the whiteboard is in use, the sustained network bandwidth requirement is far below those of video conferencing solutions—suitable even for use in a dial-up network.

4.0 Capturing Printed Documents and Annotations.

The RTWCS can also be used to capture handwriting annotations on printed documents in real time—a common scenario in teleconferencing when participants need to share paper documents. A gooseneck support can be employed so the camera can be pointed downward securely. When capturing 8.5"×11" sized documents, it was found that the document image is legible down to 6 point fonts.

To overcome the problem of small movements of the paper when it is being written on, an efficient homography-based image matching algorithm was added to align each input video frame to first frame—equivalent to motion stabilizing the input video. This modification removes most of the resets related to paper movement and makes the system much more usable.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

Appendix: Plane-Based Whiteboard Color Estimation Only one component of the color image is considered, but the technique described below applies to all components (R, G, B, or Y). Each cell i is defined by its image coordinates $(x_i, y_i)$. Its color is designated by $z_i$ (z=R, G, B, or Y). The color is computed as described in Section 2.3.2, and is therefore noisy and even erroneous. From experience with the meeting rooms, the color of the whiteboard varies regularly. It is usually much brighter in the upper part and becomes darker toward the lower part, or is much brighter in one of the upper corners and becomes darker toward the opposite lower corner. This is because the lights are installed against the ceiling. Therefore, for a local region (e.g., 7×7 cells), the color can be fit accurately by a plane; for the whole image, a plane fitting is still very reasonable, and provides a robust indication whether a cell color is an outlier.

A plane can be represented by ax+by+c−z=0. A set of 3D points $\{(x_i, y_i, z_i) | i=1, \ldots, n\}$ with noise only in $z_i$ is given. The plane parameters $p=[a,b,c]^T$ can be estimated by minimizing the following objective function:

$$F = \sum_i f_i^2,$$

where $f_i = ax_i + by_i + c - z_i$. The least-squares solution is given by $p = (A^T A)^{-1} A^T z$, where $$A = \begin{bmatrix} x_1 & y_1 & 1 \\ \ldots & \ldots & \ldots \\ x_n & y_n & 1 \end{bmatrix}$$

and $z = [z_1, \ldots, z_n]^T$. Once the plane parameters are determined, the color of the cell i is replaced by $\hat{z}_i = ax_i + by_i + c$.

The least-squares technique is not robust to erroneous data (outliers). As mentioned earlier, the whiteboard color initially computed does contain outliers. In order to detect and reject outliers, a robust technique to fit a plane to the whole whiteboard image is used. The least-median-squares [11], a very robust technique that is able to tolerate near half of the data to be outliers, is used. The idea is to estimate the parameters by minimizing the median, rather than the sum, of the squared errors, i.e., $$\min_p \; \text{median}_i \; f_i^2.$$

First m random subsamples of 3 points are drawn (3 is the minimum number to define a plane). Each sub-sample gives an estimate of the plane. The number m should be large enough such that the probability that at least one of the m sub-samples is good is close to 1, say 99%. If it is assumed that half of the data could be outliers, then m=35, therefore the random sampling can be done very efficiently. For each sub-sample, the plane parameters and the median of the squared errors $f_i^2$ are computed. The plane parameters that give the minimum median of the squared errors were retained, denoted by M. Then the so-called robust standard deviation $\sigma = 1.4826\sqrt{M}$ (the coefficient is used to achieve the same efficiency when no outliers are present) is computed. A point i is considered to be an outlier and discarded if its error $|f_i| > 2.5\sigma$. Finally, a plane is fit to the good points using the least-squares technique described earlier. The color of an outlier cell i is replaced by $\hat{z}_i = ax_i + by_i + c$.

REFERENCES

1. Abowd, G. D, Atkeson, C. G., Jason A., Brotherton, J. A., Enqvist, T., Gulley, P. & Lemon, J., Investigating the capture, integration and access problem of ubiquitous computing in an educational setting. In the *Proceedings of CHI '98*, pp. 440-447, May, 1998.
2. Chiu, P., Kapuskar, A., Reitmeier, S., and Wilcox, L. Note-Look: Taking notes in meetings with digital video and ink. *Proceedings of ACM Multimedia '99*. ACM, New York, pp. 149-158.
3. Duda, R. O., Hart, P. E. and Stork, D. G. *Pattern Classification*, Second Edition, John Wiley & Sons, New York, 2001.
4. Ju, S. X., Black, M. J., Minnerman, S. & Kimber D. Analysis of Gesture and Action in Technical Talks for Video Indexing. In *IEEE Trans. on Circuits and Systems for Video Technology*.
5. Laroche, A. Claude & Prescott, M. A., Apparatus and Method for Adaptively Interpolating a Full Color Image Utilizing Chrominance Gradients, U.S. Pat. No. 5,373,322, 1994.
6. Moran, T. P., Palen, L., Harrison, S., Chiu, P., Kimber, D., Minneman, S., Melle, W. v. & Zellweger, P., ""I'll Get That Off the *Audio*": A Case Study of Salvaging Multimedia Meeting Records," in Proceedings of CHI '97, Atlanta, Ga., 1997.
7. Pedersen, E., McCall, K., Moran, T. P., & Halasz, F., Tivoli: An electronic whiteboard for informal workgroup meetings. Proceedings of INTERCHI'93. pp 391-389.
8. Rousseeuw, P. and Leroy, A. *Robust Regression and Outlier Detection*, John Wiley & Sons, New York, 1987.
9. Stifelman, L. J., Arons, B., Schmandt, C. & Hulteen, E. A. VoiceNotes: A Speech Interface for a Hand-Held Voice Notetaker. *Proc. INTERCHI'93 (Amsterdam,* 1993), ACM
10. Saund, E. Image Mosaicing and a Diagrammatic User Interface for an Office Whiteboard Scanner. Technical Report, Xerox Palo Alto Research Center, 1999.
11. Weber, K. & Poon, A., Marquee: A tool for real-time video logging. Proceedings of CHI'94. pp 58-64.
12. Wilcox, L. D., Schilit, B. N. & Sawhney, N., Dynomite: A dynamically organized ink and audio notebook. Proceedings of CHI'97. pp 186-193.
13. Whittaker, S., Hyland, P. & Wiley, M., Filochat: Handwritten notes provide access to recorded conversations. Proceedings of CHI'94. pp 271-276.
14. Wolf, C., Rhyne, J. & Briggs, L., Communication and information retrieval with a pen-based meeting support tool. Proceedings of CSCW'92. pp 322-329.
15. He, L., Liu, Z., & Zhang, Z., "Why Take Notes? Use the Whiteboard System," in *Proc. International Conference on Acoustics, Speech, and Signal Processing* (ICASSP'03), Vol. V, pp. 776-779, Hong Kong, April 2003.

Wherefore, what is claimed is:

1. A system for transferring the content of data written on a whiteboard to at least one remote meeting participant, comprising:
    a capture system that captures a sequence of images of content written on a whiteboard and audio signals corresponding to sounds that occur during a meeting;
    an analysis server for analyzing the sequence of images and transmitting whiteboard content without foreground obstructions and associated audio to a remote meeting participant in real-time wherein the analysis server comprises modules for:
    dividing each of said images into cells of cell images;
    for each image,
        determining if the cell images have changed from the last frame;
        computing the background color of the cell images which represent the color of blank whiteboard;
        updating a whiteboard background model by integrating the color of the blank whiteboard computed from the cell images;
        classifying the cell images into foreground or whiteboard cells using the whiteboard color model;
        extracting changed whiteboard content; and
        outputting changed whiteboard content to at least one remote participant.

2. The system of claim 1 further comprising a module for enhancing the color of whiteboard content.

3. The system of claim 1 wherein each image frame is processed in Bayer color format.

4. The system of claim 3 wherein the sequence of images are captured in Bayer color format.

5. The system of claim 1 wherein the analysis server processes and outputs changed whiteboard content in real-time.

* * * * *